United States Patent [19]

Takizawa et al.

[11] 4,111,119
[45] Sep. 5, 1978

[54] RECORD SHEET CLAMPING MECHANISM FOR DRUM TYPE FACSIMILE AND THE LIKE

[75] Inventors: Tatsuo Takizawa, Sagamihara; Masachika Ikeda, Mitaka, both of Japan

[73] Assignee: Olympus Optical Co., Ltd., Tokyo, Japan

[21] Appl. No.: 783,017

[22] Filed: Mar. 30, 1977

[30] Foreign Application Priority Data

Apr. 5, 1976 [JP] Japan .............................. 51/40868[U]

[51] Int. Cl.² ...................... B41F 27/06; B41F 15/38; B41L 29/14
[52] U.S. Cl. .................................. 101/127.1; 51/169; 101/415.1; 346/138; 271/277
[58] Field of Search .............................. 101/132, 415.1; 51/367–369, 169; 346/138; 271/82, 277

[56] References Cited

U.S. PATENT DOCUMENTS

| 967,079 | 8/1910 | Stipe et al. | 51/367 |
| 984,501 | 2/1911 | Stipe et al. | 51/367 |
| 1,992,105 | 2/1935 | Walker | 51/367 |
| 2,046,122 | 6/1936 | Hunt | 51/367 |
| 2,789,776 | 4/1957 | Begun et al. | 346/138 |
| 3,029,569 | 4/1962 | Gregora | 51/368 |
| 3,854,715 | 12/1974 | Coleman | 271/277 |

*Primary Examiner*—William Pieprz
*Attorney, Agent, or Firm*—Haseltine, Lake & Waters

[57] ABSTRACT

A record sheet clamping mechanism for a drum type facsimile and the like which can detachably hold one end of a record sheet on the outer peripheral surface of a rotary cylindrical drum by means of a clamping bar is disclosed. The mechanism comprises a balancing member which can always maintain substantially constant pressing force of the clamping bar to be applied to the record sheet irrespective of the number of rotations of the cylindrical drum.

4 Claims, 4 Drawing Figures

RECORD SHEET CLAMPING MECHANISM FOR DRUM TYPE FACSIMILE AND THE LIKE

This invention relates to a record sheet clamping mechanism for a drum type facsimile and the like which comprises a hollow cylindrical drum for winding a record sheet such as a manuscript copy therearound and a clamping bar extended along the outer peripheral surface of the cylindrical drum in the axial direction thereof and detachably holding one end of the record sheet on the outer peripheral surface of the cylindrical drum.

Heretofore, it has been the common practice to provide a record sheet clamping mechanism for a drum type facsimile comprising a hollow cylindrical drum secured to a rotary shaft, a clamping bar extended along the outer peripheral surface of the cylindrical drum in the axial direction thereof and movable in the radial direction of the cylindrical drum and a tension spring having one end connected to the rotary shaft or an end plate of the cylindrical drum and urging the clamping bar through the record sheet against the outer peripheral surface of the cylindrical drum. Such conventional record sheet clamping mechanism is capable of detachably holding one end of the record sheet on the outer peripheral surface of the cylindrical drum by means of the clamping bar.

Such conventional record sheet clamping mechanism, however, makes use of a tension spring for the purpose of producing a pressing force of the clamping bar and hence has the drawbacks that the pressing force becomes changed in response to various rotating speeds of the cylindrical drum and that there is a risk of the record sheet being removed from the cylindrical drum if the pressing force of the clamping bar becomes weak when the cylindrical drum is rotated at a high speed and hence the centrifugal force subjected to the clamping bar is increased.

An attempt has been made to increase beforehand the tensile force of the tension spring to such an extent that the centrifugal force subjected to the clamping bar is counteracted by the increased tensile force of the tension spring. Such attempt, however, has led to such drawbacks that since the tensile force of the tension spring is large, a much amount of force is reuired to release the clamping bar in order to insert or remove the one end of the record sheet into or from a space formed between the clamping bar and the outer peripheral surface of the cylindrical drum and that parts operatively associated with the mechanism become complex in construction.

An object of the invention, therefore, to provide a record sheet clamping mechanism for drum type facsimile and the like which can obviate the above described drawbacks which have been encountered with the conventional techniques and which can always maintain a constant pressing force subjected to a clamping bar and urging a record sheet against a cylindrical drum.

A feature of the invention is the provision of a record sheet clamping mechanism for a drum type facsimile and the like comprising a hollow cylindrical drum secured to a rotary shaft and for winding a record sheet therearound and a clamping bar extending along the outer peripheral surface of the cylindrical drum in the axial direction thereof and detachably holding one end of the record sheet on the outer peripheral surface of the cylindrical drum, the improvement comprising a balancing member arranged at a position which is substantially symmetrical to the clamping bar with respect to the rotary shaft of the cylindrical drum and connected to a slidable disc loosely connected to the clamping bar and a spring for urging the clamping bar against the outer peripheral surface of the cylindrical drum, whereby the centrifugal force subjected to the clamping bar due to rotation of the cylindrical drum is made substantially equal to the centrifugal force subjected to the balancing member, thereby always maintaining a substantially constant pressing force of the clamping bar to be applied to the record sheet irrespective of the number of rotations of the cylindrical drum.

The invention will now be described in greater detail with reference to the accompanying drawings, wherein.

Figure 1:
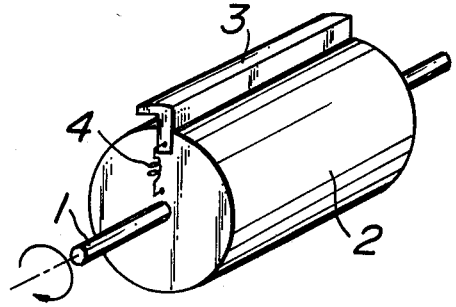
FIG. 1 is a perspective view showing one example of a conventional record sheet clamping mechanism for a drum type facsimile.
Figure 2:
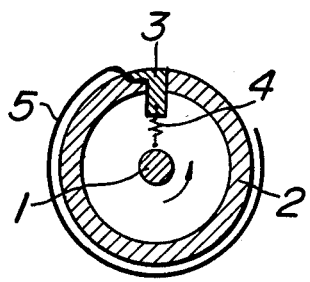
FIG. 2 is its transverse cross sectional view.

In FIGS. 1 and 2 is shown a conventional record sheet clamping mechanism for a drum type facsimile, comprising a rotary shaft 1, a hollow cylindrical drum 2 secured to the rotary shaft 1 and provided at its outer peripheral surface with a clamping bar 3 extending along the outer peripheral surface of the cylindrical drum 2 in the axial direction thereof and slidably movable in the radial direction of the cylindrical drum 2. Between the lower ends of the clamping bar 3 and end plates of the cylindrical drum 2 are connected tension springs 4 which function to urge the clamping bar 3 downwardly until the upper surface of the clamping bar 3 becomes in flush with the outer peripheral surface of the cylindrical drum 2. As a result, it is possible to detachably hold one end of a record sheet 5 by urging it by the clamping bar 3 against the outer peripheral surface of the drum 2 as shown in FIG. 2.

In such kind of conventional record sheet clamping mechanism, the tensile force of the tension springs 4 causes the clamping bar 3 to urge the record sheet 5 against the outer peripheral surface of the cylindrical drum 2. As a result, if the cylindrical drum 2 is rotated, centrifugal force is subjected to the clamping bar 3 to reduce the pushing force of the clamping bar 3 acting upon the record sheet 5. Thus, the pushing force of the clamping bar 3 acting upon the record sheet 5 is varied in response to changes of the rotating speed of the cylindrical drum 2. In addition, there is a risk of the record sheet 5 being removed out of the cylindrical drum 2 by an increase of the centrifugal force subjected to the clmping bar 3 when the cylindrical drum 2 is rotated at a high speed. On the one hand, it is possible to make the tensile force of the tension spring 4 so strong beforehand that this tensile force can compensate for the increase of the centrifugal force of the clamping bar 3. In this case, even if the pushing force of the clamping bar 3 against the record sheet 5 is reduced, the tension spring 4 functions to prevent the record sheet 5 from being removed from the cylindrical drum 2. But, if the cylindrical drum 2 is rotated at a high speed, the tensile force of the tension spring 4 must be increased correspondingly. If the tensile force of the tension spring 4 is made large, a large force is required in the case of releasing the clamping bar 3 from the record sheet 5 for the purpose of removing the record sheet 5 from the cylindrical drum 2 or fixing it onto the latter. Thus, the parts operatively associated with the mechanism become complex in construction. Such problem occurs not only in the drum type facsimile but also in any other device in which a cylindrical drum together with a sheet wound around it are rotated.

An embodiment of a record sheet clamping mechanism for a drum type facsimile according to the invention which can obviate the above mentioned drawbacks which have been encountered with the conventional technique will now be described with reference to FIGS. 3 and 4.

Figure 3:
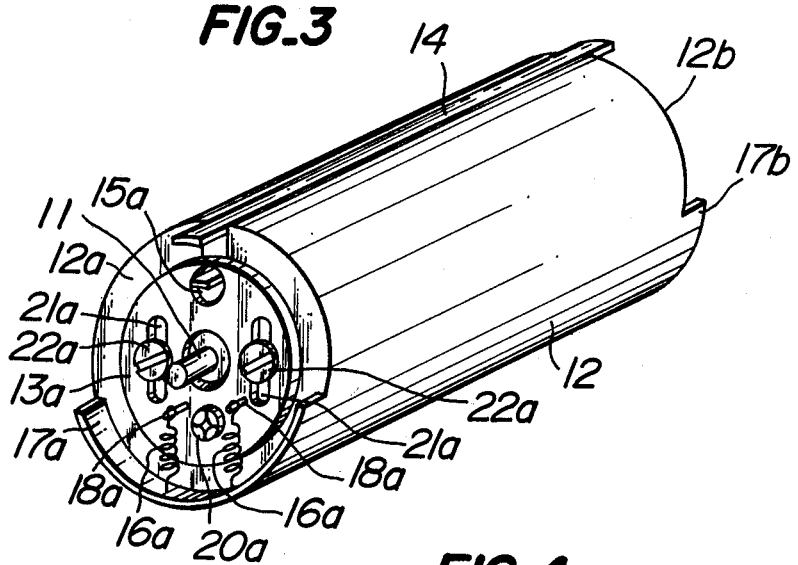
FIG. 3 is a perspective view showing one embodiment of a record sheet clamping mechanism for a drum type facsimile according to the invention.
Figure 4:
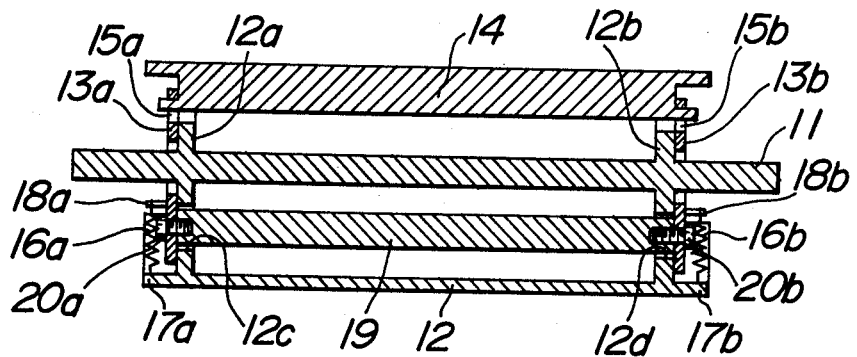
FIG. 4 is its longitudinal cross sectional view.

Referring to FIGS. 3 and 4, reference numeral 11 designates a rotary shaft and 12 a hollow cylindrical drum secured to the rotary shaft 11 and winding a record sheet (in the present embodiment, a manuscript copy) therearound. 12a and 12b show end plates of the cylindrical drum 12 and 13a and 13b slidable discs slidably mounted on the end plates 12a and 12b, respectively. 14 is a clamping bar for detachably holding one end of the record sheet to be wound around the cylindrical drum 12. The clamping bar 14 is extended along the outer peripheral surface of the cylindrical drum 12 in its axial direction and has both end portions engaged with holes 15a and 15b formed near the peripheral edge of the slidable discs 13a and 13b, respectively, such that the clamping bar 14 is slidably movable together with the slidable discs 13a, 13b in the radial direction of the cylindrical drum 12. 16a and 16b designate tension springs each connected at its one end to portions 17a and 17b projected from the both ends of the cylindrical drum 12 and connected at the other end to pins 18a and 18b provided on the slidable discs 13a and 13b, respectively. The tension springs 16a and 16b function to urge the clamping bar 14 against the outer peripheral surface of the cylindrical drum 12. 19 shows a counter balancing rod arranged at a position which is substantially symmetrical to the clamping bar 14 with respect to the rotary shaft 11. At such substantially symmetrical position, the centrifugal force $mR\omega^2$ acting on the clamping bar 14 is equal to the centrifugal force $Mr\omega^2$ acting of the balancing rod 19, i.e.

$$mR = Mr$$

where $m$ is a mass of the clamping bar 14, $R$ is a distance from the rotary axis of the shaft 11 to the clamping bar 14, $\omega$ is an angular velocity, $M$ is a mass of the counter balancing rod 19, and $r$ is a distance from the rotary axis of the shaft 11 to the counter balancing rod 19. The both ends of the counter balancing rod 19 are extended through holes 12c and 12d formed in the drum end plates 12a and 12b, respectively, and secured to the slidable discs 13a and 13b by means of screws 20a and 20b, respectively. As a result, the counter balancing rod 19 can move together with the slidable discs 13a, 13b and the clamping bar 14. The slidable disc 13a is provided at diametrically opposite positions thereof with elongate guide grooves 21a, 21a with which are engaged guide pins 22a, 22a provided on the drum end plates 12a, 12b, respectively, for the purpose of making the slidable discs 13a, 13b slidably move along the drum end plates 12a, 12b.

In the above described record sheet clamping mechanism for drum type facsimile according to the invention, if the cylindrical drum 12 is rotated, the centrifugal force subjected to the clamping bar 14 becomes substantially equal to the centrifugal force subjected to the counter balancing rod 19 arranged substantially symmetrical to the clamping bar 14 with respect to the rotary shaft 11, and as a result, the pressing force of the clamping bar 14 urging the record sheet 5 against the outer peripheral surface of the cylindrical drum 2 is not influenced by any centrifugal force subjected thereto due to different number of rotations of the cylindrical drum 12. Thus, the pressing force of the clamping bar 14 urging the record sheet 5 against the outer peripheral surface of the drum 2 can be made substantially constant by means of the tension springs 16a and 16b irrespective of the number of rotations of the drum 12.

The invention is not limited to the above described embodiment and various changes and modifications are possible. For example, in the above described embodiment, the both ends of the clamping bar 14 have been loosely engaged with the holes 15a and 15b formed in the slidable discs 13a and 13b, respectively, for the purpose of preventing the slidable discs 13a and 13b from being inclined with respect to the sliding direction of the clamping bar 14 and preventing the clamping bar 14 from becoming twisted and the record sheet from being removed from the drum 12. Alternatively, the clamping bar 14 may be slidably moved in the radial direction of the cylindrical drum 12 and may be directly secured to the slidable discs 13a and 13b. In addition, the slidable discs 13a and 13b are omitted and both the clamping bar 14 and the counter balancing rod 19 may be interlocked with each other through holes formed in the rotary shaft 11. In this case, the tension springs 16a and 16b may be connected between the clamping bar 14 and the rotary shaft 11 or between the counter balancing bar 19 and the internal peripheral surface of the cylindrical drum 12. Moreover, in the above described embodiment, all of the rotary shaft 11, end plates 12a, 12b and cylindrical drum 12 have been made integral with each other. Alternatively, these members may be made separate from each other.

What is claimed is:

1. An improved record sheet clamping mechanism for a drum type facsimile and the like, employing a hollow cylindrical drum secured to a rotary shaft for winding a record sheet therearound; a clamping bar extending along the outer peripheral surface of the cylindrical drum in an axial direction thereof and detachably holding one end of said record sheet on the outer peripheral surface of said cylindrical drum; the improvement comprising: a balancing member coextensive with and being disposed substantially symmetrical to said clamping bar with respect to said rotary shaft of said cylindrical drum, and being rigidly connected to slidable discs loosely connected to said clamping bar; tension spring means for urging said clamping bar through said slidable disc against an outer peripheral surface of said cylindrical drum, whereby the centrifugal force to which said clamping bar is subjected due to rotation of said cylindrical drum is substantially equal to the centrifugal force to which said balancing member is subjected thereby maintaining a substantially constant pressing force of said clamping bar for application to said record sheet irrespective of the number of rotations of said cylindrical drum.

2. A record sheet clamping mechanism according to claim 1, wherein said balancing member is formed of a counter balancing rod secured at both ends to said slidable discs, said slidable discs being loosely connected to said clamping bar and resiliently connected to said cylindrical drum.

3. A record sheet clamping mechanism according to claim 1, wherein: said balancing member is interlocked with said slidable discs through holes formed in end plates of said cylindrical drum said end plates being integral with said rotary shaft of said drum said clamping bar and tension spring means connected between said clamping bar and said rotary shaft.

4. A record sheet clamping mechanism according to claim 3, wherein: said tension spring means are connected to said balancing member and said slidable discs and are loosely connected through said end plate to said clamping bar.

* * * * *